United States Patent
Lin

(10) Patent No.: US 6,916,102 B2
(45) Date of Patent: Jul. 12, 2005

(54) LAMP REPLACEMENT DEVICE FOR A DIRECT BACKLIGHT MODULE

(75) Inventor: Kuan-Li Lin, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 0 days.

(21) Appl. No.: 10/337,062

(22) Filed: Jan. 6, 2003

(65) Prior Publication Data

US 2004/0012948 A1 Jan. 22, 2004

(30) Foreign Application Priority Data

Jul. 18, 2002 (TW) .......................... 91116068 A

(51) Int. Cl.⁷ ................................................ F21V 7/04
(52) U.S. Cl. ........................ 362/31; 362/226; 362/260; 362/375; 362/549; 349/70
(58) Field of Search .................... 362/97, 226, 216, 362/375, 260, 31, 486, 488, 549; 349/70, 58, 349

(56) References Cited

U.S. PATENT DOCUMENTS

| | | | | |
|---|---|---|---|---|
| 5,280,372 A | * | 1/1994 | Horiuchi ...................... | 349/65 |
| 5,588,740 A | * | 12/1996 | Kasuga ........................ | 362/221 |
| 5,738,438 A | * | 4/1998 | Hesprich ..................... | 362/374 |
| 5,845,989 A | * | 12/1998 | Leen ........................... | 362/410 |
| 6,062,713 A | * | 5/2000 | Renlger et al. ............. | 362/477 |
| 6,102,550 A | * | 8/2000 | Edwards, Jr. ............... | 362/221 |
| 6,167,648 B1 | * | 1/2001 | Dimmick ..................... | 40/564 |
| 6,330,150 B1 | * | 12/2001 | Kim ........................... | 361/683 |
| 6,390,652 B1 | * | 5/2002 | Echito ........................ | 362/374 |
| 6,639,636 B2 | * | 10/2003 | Yoo et al. .................... | 349/61 |
| 2001/0035923 A1 | * | 11/2001 | Cha et al. .................... | 349/65 |
| 2002/0021564 A1 | * | 2/2002 | Cho et al. .................... | 362/97 |
| 2002/0044437 A1 | * | 4/2002 | Lee ............................. | 362/31 |

* cited by examiner

Primary Examiner—Thomas M. Sember
Assistant Examiner—Jacob Y. Choi
(74) Attorney, Agent, or Firm—Thomas, Kayden, Horstemeyer & Risley

(57) ABSTRACT

A direct backlight apparatus for a Liquid Crystal Display (LCD) panel includes a lamp housing and a lamp. The lamp housing accommodates a support structure disposed on the bottom of the lamp housing wherein an open end is defined by one side of the lamp housing. The lamp, supported by the support structure, is installed in the lamp housing and is further attached to a holding structure at one end of the lamp, for holding the lamp. The lamp is removed from the lamp housing through the open end by moving along a direction of the support structure when a force is exerted on the holding structure.

15 Claims, 6 Drawing Sheets

LAMP REPLACEMENT DEVICE FOR A DIRECT BACKLIGHT MODULE

This application claims the benefit of Taiwan application Serial No. 091116068, filed Jul. 18, 2002.

BACKGROUND OF THE INVENTION

1. Field of the Invention

The invention relates in general to a direct backlight module, and more particularly to a lamp replacement device for a direct backlight module.

2. Description of the Related Art

Liquid Crystal Displays (LCDs) have been widely used in recent years due to the features of thinness, lightness, and low radiation.

LCDs include reflective-type LCDs and transmissive-type LCDs. A transmissive-type LCD requires a backlight module disposed on the rear of the LCD panel for providing light source to the LCD panel. Referring to FIG. 1, a LCD display having a direct backlight module is shown. In general, the LCD display with a large size LCD panel 102 has a direct backlight module 104 disposed on the rear of the LCD panel 102. The direct backlight module includes a lamp housing 104 and several lamps 106 disposed in the lamp housing 104. Two ends of the lamp 106 are attached to the lamp housing 104 by using a silicon rubber. The lamps 106 disposed on the rear of the LCD panel 102 provide light source for the LCD panel 102.

Referring to FIG. 2A–2B, the arrangement of the straight-line lamps in the direct backlight module is shown. The LCD panel 202 defines a long side and a short side. The lamp 204 can be disposed parallel to the long side of the LCD panel 202, as shown in FIG. 2A. The lamp 204 can also be disposed parallel to the short side of the LCD panel 202, as shown in FIG. 2B. Referring to FIG. 3A–3B, the arrangement of the U-shaped lamps in the direct backlight module is shown. In addition to the straight-line lamps, the lamps can be U-shaped lamps, as shown in FIG. 3A–3B. As shown in FIG. 3A, the lamp 304 can be disposed parallel to the long side of the LCD panel 302. As shown in FIG. 3B, the lamp 304 can also be disposed parallel to the short side of the LCD panel 302.

It is noted that several lamps are disposed on the rear of the LCD panel for providing uniform and sufficient light source for the LCD panel to optimize the performance and image quality. Given that each lamp has its life period, lamps had better to be timely replaceable in order to steadily provide uniform and sufficient light source for the LCD panel.

The conventional approach for lamp replacement of the backlight module is as follows: First of all, the lamp housing needs to be disassembled from the rear of the LCD panel. After removing the silicon rubber attached to the two ends of the lamp, the lamp can be retrieved from the lamp housing. Thereafter, a new lamp is installed in the lamp housing, and two ends of the new lamp are attached to the lamp housing by using silicon rubber. The lamp housing is reassembled to the rear of the LCD panel, and the lamp replacement is therefore complete.

The disadvantage of the conventional approach for lamp replacement of the backlight module is complex and lengthy. Users have to disassemble the whole lamp housing to replace the used lamp, even there is only one. In particular, the lamp housing and the lamps are very heavy to carry. Therefore, the steps for disassembling the lamp housing and replacing the lamps are time-consuming and laborious. Besides, the backlight module and the LCD panel are vulnerable to be damaged in the course of lamp replacement. Since the lamps have to be frequently replaced as compared to other components of the LCD display, the disadvantage of the conventional approach for lamp replacement of the backlight module will become more apparent.

SUMMARY OF THE INVENTION

It is an object of the invention to provide a lamp replacement device for a direct backlight module. Each individual lamp can be replaced without disassembling the whole lamp housing.

The invention achieves the above-identified objects by providing a direct backlight apparatus for a Liquid Crystal Display (LCD) panel, and the direct backlight apparatus includes a lamp housing and a lamp. The lamp housing includes a support structure disposed an the bottom of the lamp housing and an open end defined by one side of the lamp housing. The lamp, installed in the lamp housing, is supported by the support structure and includes a first holding structure disposed at one end of the lamp to hold the lamp and a second holding structure disposed at the other end of the lamp to hold an interval between a lamp tube of the lamp and the support structure. The lamp is carried by the first holding structure for being removed from the lamp housing through the open end along a direction of the support structure when a force is exerted on the first holding structure.

Other objects, features, and advantages of the invention will become apparent from the following detailed description of the preferred but non-limiting embodiments. The following description is made with reference to the accompanying drawings.

DETAILED DESCRIPTION OF THE INVENTION

The feature design of the lamp replacement device for a direct backlight module according to the invention is the first holding structure disposed at one end of the lamp, the second holding structure disposed at the other end of the lamp, and the support structure with an open end disposed on the bottom of the lamp housing. By exerting a force on the first holding structure, the lamp is carried by the first holding structure for being removed from the lamp housing through the open end along a direction of the support structure. Therefore, lamp replacement can be achieved easily without dissembling the whole lamp housing. Besides, the replacement of individual lamp could no longer be a problem.

Figure 1:
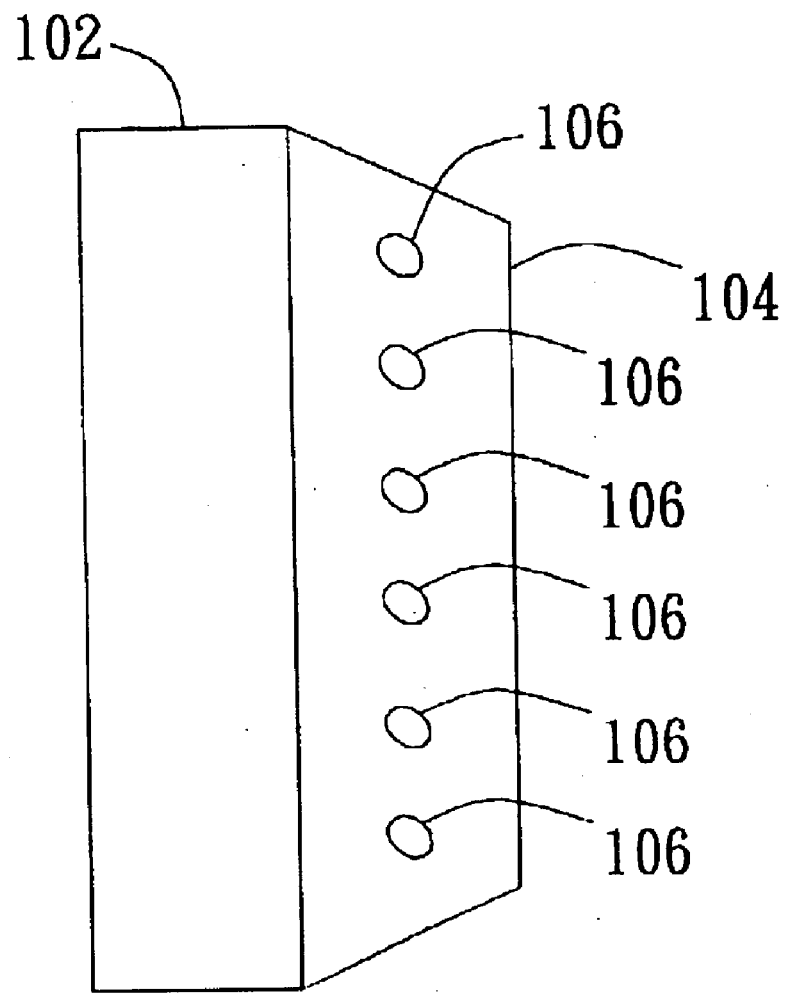
FIG. 1 (Prior Art) shows a LCD display having a direct backlight module.
Figure 2A:
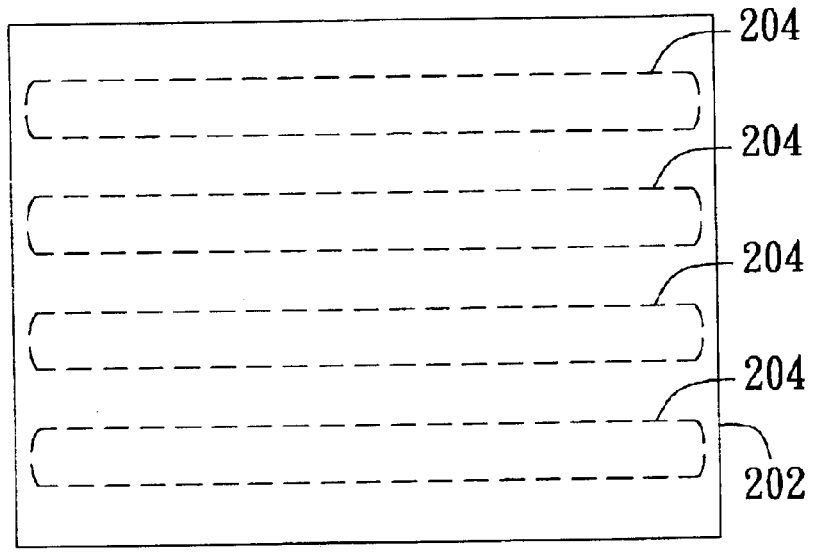
FIGS. 2A–2B (Prior Art) show the disposition of the lamps in the direct backlight module.
Figure 2B:
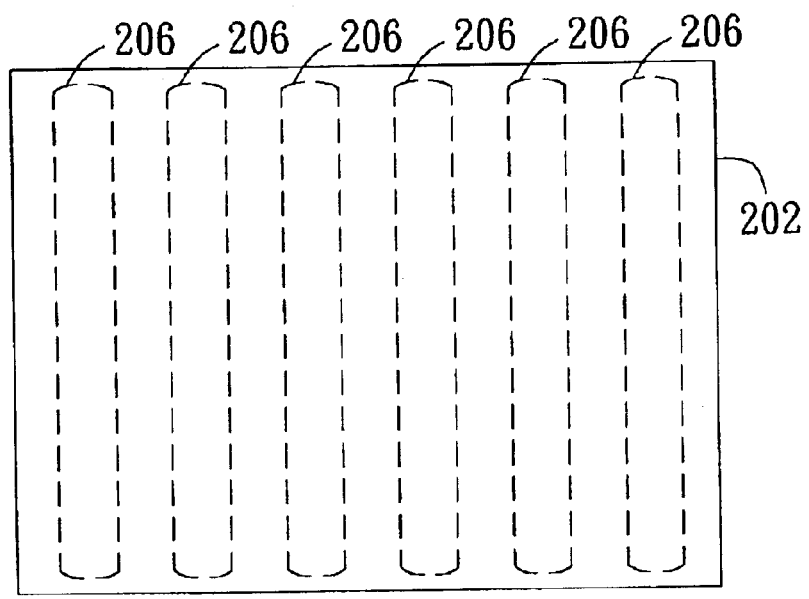
Figure 3A:
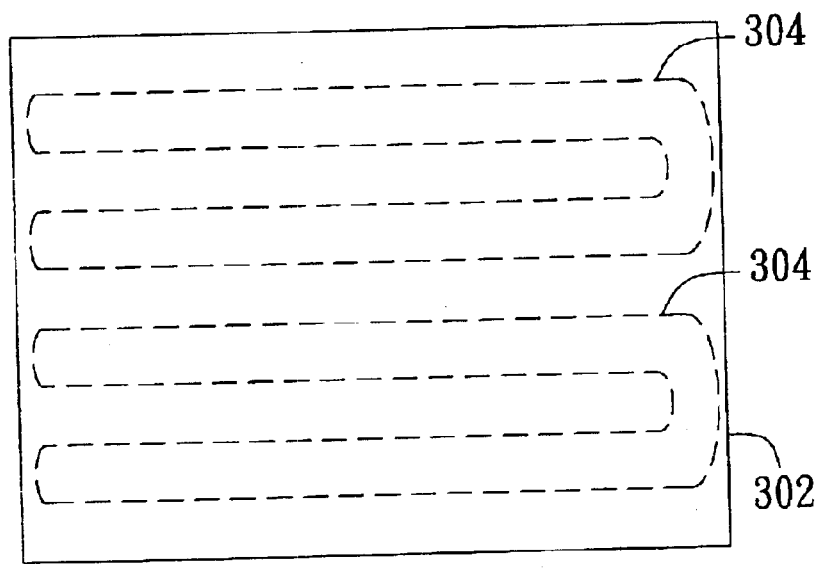
FIGS. 3A–3B (Prior Art) show the disposition of the U-shaped lamps in the direct backlight module.
Figure 3B:
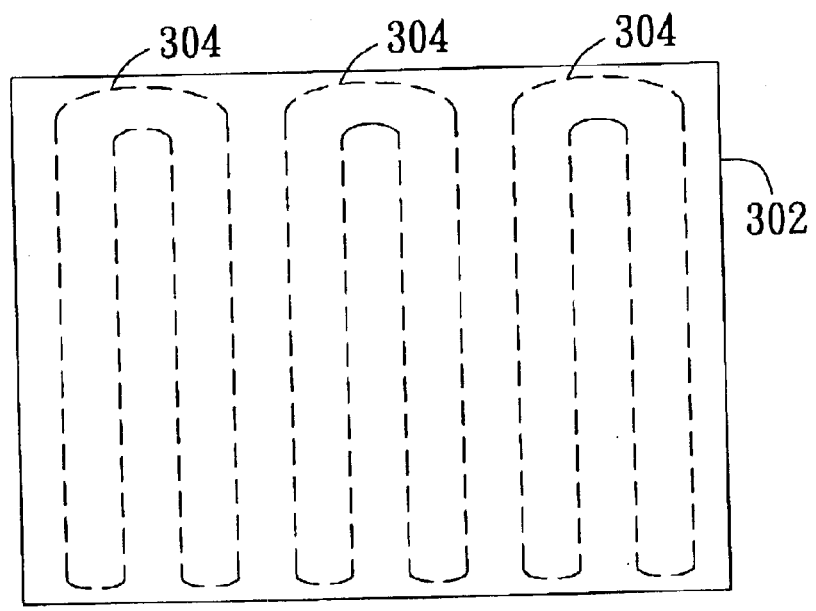
Figure 4A:
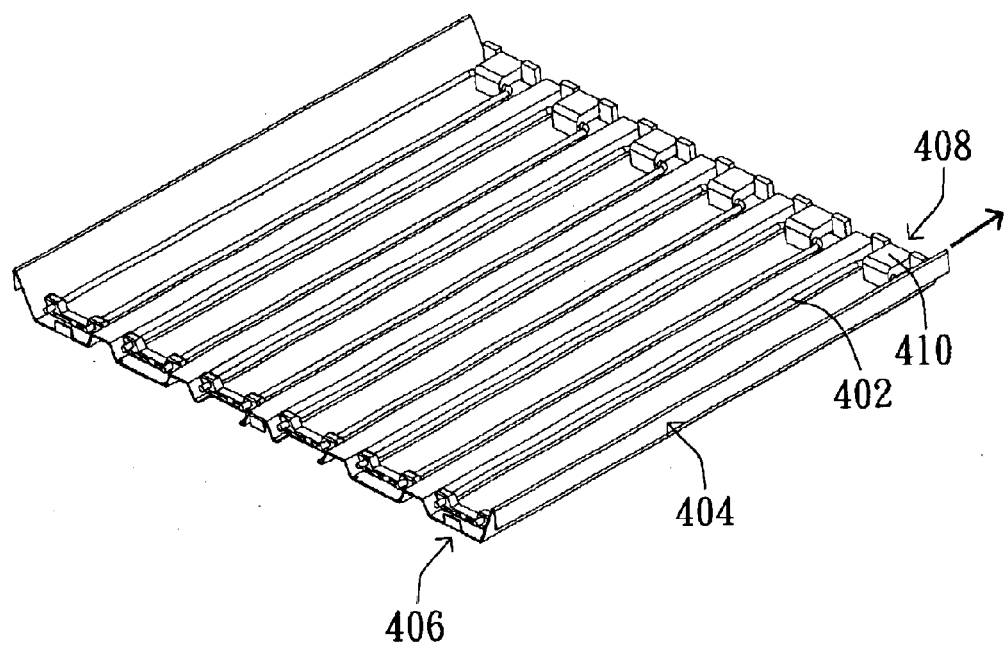
FIG. 4A is a perspective view of a lamp replacement device for a direct backlight module according to a preferred embodiment of the invention.
Figure 4B:
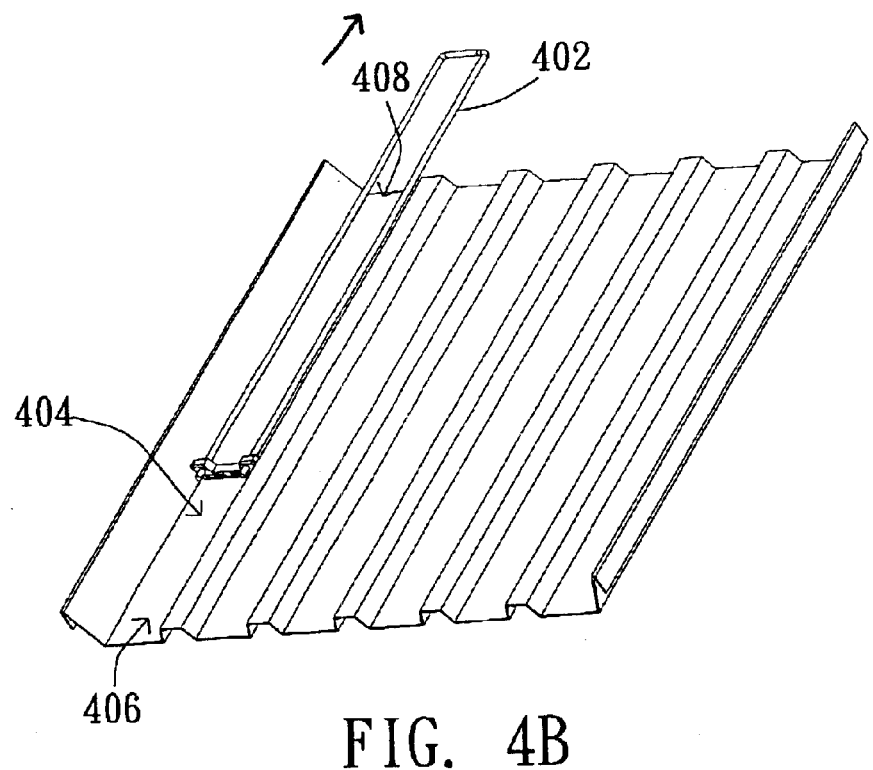
FIG. 4B shows the operation of the lamp replacement device for the direct backlight module according to the preferred embodiment of the invention.

Referring to FIG. 4A, a perspective view of a lamp replacement device for a direct backlight module according to a preferred embodiment of the invention is shown. The direct backlight apparatus for a Liquid Crystal Display (LCD) panel, the direct backlight apparatus includes a lamp housing and a numbers of U-shaped lamps 402. A support structure having a groove 404 disposed on the bottom of the lamp housing supports the U-shaped lamp 402, and at least an open end defined by one side of the lamp housing. As shown in FIG. 4A, two open ends 406 and 408 are disposed at two ends of the groove 404 respectively. FIG. 4B shows the operation of the lamp replacement device for the direct backlight module according to the preferred embodiment of the invention. The support structure having the groove 404 is used for not only supporting the U-shaped lamp 404 but also providing a direction for the U-shaped lamp 402 to move along as indicated in FIG. 4B.

Figure 5:
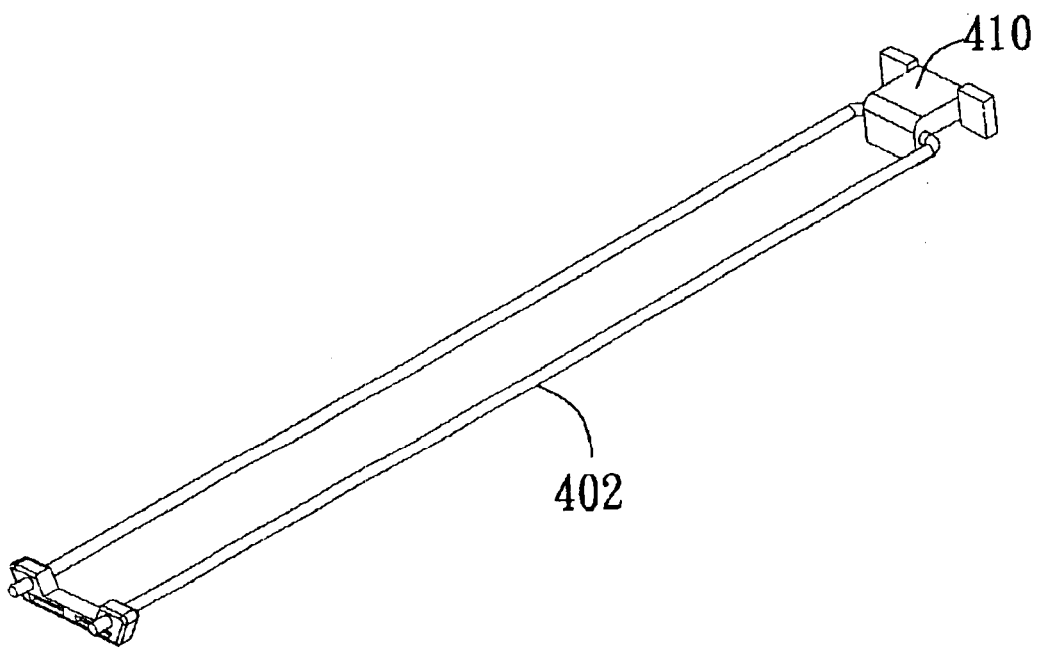
FIG. 5 is a perspective view of the U-shaped lamp of the lamp replacement device for the direct backlight module according to the preferred embodiment of the invention.

Referring to FIG 5, a perspective view of the U-shaped lamp of the lamp replacement device for the direct backlight module according to the preferred embodiment of the invention is shown. As compared with the conventional U-shaped lamp, the structure of the U-shaped lamp 402 has gone through innovation. The U-shaped lamp 402 includes a first holding structure 410 disposed at one end of the lamp 402 for holding the lamp 402 and a second holding structure 420 disposed at the other end of the lamp 402 for holding an interval between the lamp 402 and the support structure. Referring back to FIG. 4A, the first holding structure 410 and the second holding structure 420 are positioned in the U-shaped groove 404 corresponding to the open end 408 and 406 of the lamp housing respectively and supported by the support structure when the U-shaped lamp 402 is installed in the lamp housing.

The lamp replacement can be done either by manually or automatically in regard to force exertion on the first holding structure 410. The U-shaped lamp 402 is removed from the lamp housing through the open end 408 by moving along a direction of the groove 404. The lamp replacement can be done without dissembling the whole lamp housing, and furthermore, each lamp can be replaced individually. Hence, the conventional lamp housing design and the approach to lamp replacement are apparently improved to overcome the former disadvantages.

Figure 6:
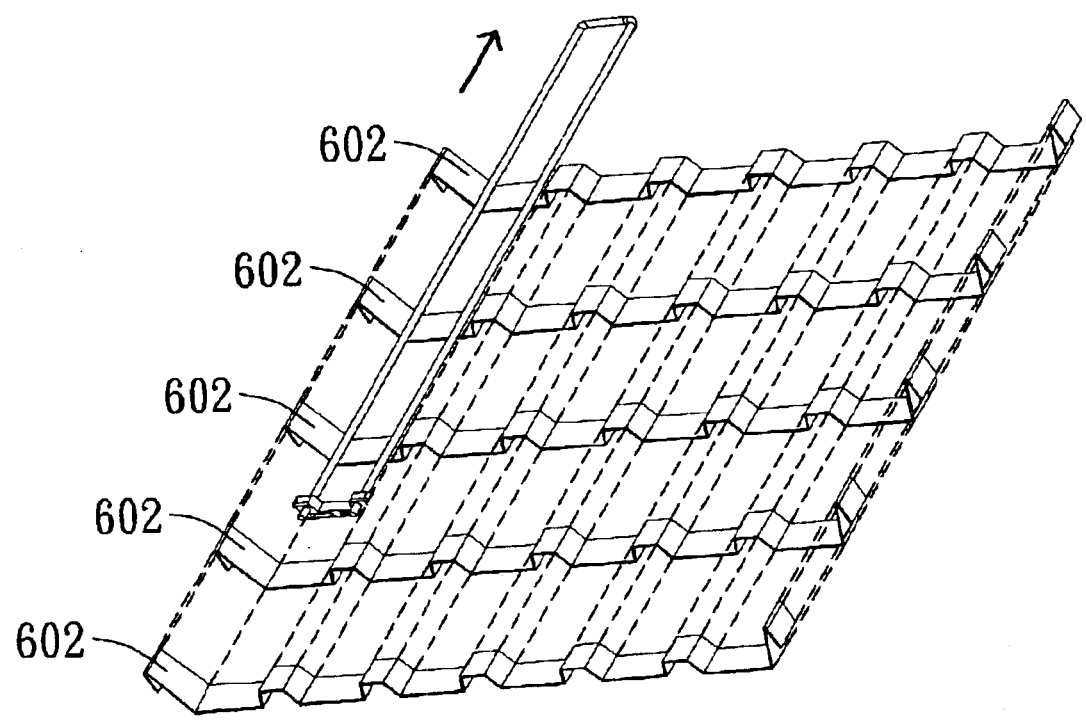
FIG. 6 shows a perspective view of a lamp replacement device for a direct backlight module according to another preferred embodiment of the invention.

It is noted that the lamp is a U-shaped lamp in the preferred embodiment of the invention but not limited thereto. It is to be understood that anyone skilled in the art can easily design a direct backlight apparatus with the straight-line lamp according to the invention. In addition, the support structure is not limited to a structure having the groove as shown in the preferred embodiment of the invention, and can be any other component to support the lamp and to help directing the lamp movement. Referring to FIG. 6, a perspective view of a lamp replacement device for a direct backlight module according to another preferred embodiment of the invention is shown. The support structure is a concave bracket or a combination of several concave brackets 602.

The lamp replacement device for a direct backlight module according to the invention is provided to replace the lamp directly without disassembling the whole lamp housing. Besides, the replacement of each lamp can proceed independently and individually. The conventional lamp housing design and the approach to lamp replacement are apparently improved to overcome the former disadvantages. Therefore, the lamp replacement operations become efficient and laborsaving.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A direct backlight apparatus for a Liquid Crystal Display (LCD) panel, the direct backlight apparatus comprising:
   a lamp housing, including:
   a support structure disposed on the bottom of the lamp housing; and
   an open end defined by one side of the lamp housing; and
   a lamp, being installed in the lamp housing and supported by the support structure, the lamp including:
   a lamp tube;
   a first holding structure disposed at a first end of the lamp tube, for holding the lamp; and
   a second holding structure disposed at a second end of the lamp tube and in contact with the support structure, for holding an interval between the lamp tube and the support structure;
   wherein the lamp is carried by the first holding structure for being removed from the lamp housing through the open end and along a direction of the support structure when a force is exerted on the first holding structure.

2. The direct backlight apparatus according to claim 1, wherein the support structure has a groove.

3. The direct backlight apparatus according to claim 2, wherein the support structure has a U-shaped groove.

4. The direct backlight apparatus according to claim 1, wherein the support structure is a concave bracket.

5. The direct backlight apparatus according to claim 1, wherein the first holding structure is positioned corresponding to the open end of the lamp housing.

6. The direct backlight apparatus according to claim 1, wherein the lamp is a U-shape lamp.

7. The direct backlight apparatus according to claim 1, wherein the lamp is a straight-line lamp.

8. The direct backlight apparatus according to claim 1, wherein the LCD panel defines a long side and a short side, and the lamp is disposed parallel to the long side.

9. The direct backlight apparatus according to claim 8, wherein the lamp is disposed parallel to the short side.

10. A lamp installed in a lamp housing, adapted for a direct backlight apparatus for a LCD panel, wherein the lamp housing includes a support structure and an open end, the lamp comprising:

a lamp tube;

a first holding structure disposed at a first end of the lamp tube, for holding the lamp; and a second holding structure disposed at a second end of the lamp tube and in contact with the support structure, for holding an interval between the lamp tube and the support structure;

wherein the lamp is carried by the first holding structure for being removed from the lamp housing through the open end and along a direction of the support structure when a force is exerted on the first holding structure.

11. The lamp according to claim 10, wherein the first holding structure is positioned corresponding to the open end of the lamp housing.

12. The lamp according to claim 10, wherein the lamp is a U-shape lamp.

13. The lamp according to claim 10, wherein the lamp is a straight-line lamp.

14. The lamp according to claim 10, wherein the LCD panel defines a long side and a short side, and the lamp is disposed parallel to the long side.

15. The lamp according to claim 14, wherein the lamp is disposed parallel to the short side.

* * * * *